No. 791,721. PATENTED JUNE 6, 1905.
D. T. OWEN.
COMBINED BED AND COUCH.
APPLICATION FILED JAN. 9, 1905.
3 SHEETS—SHEET 2.
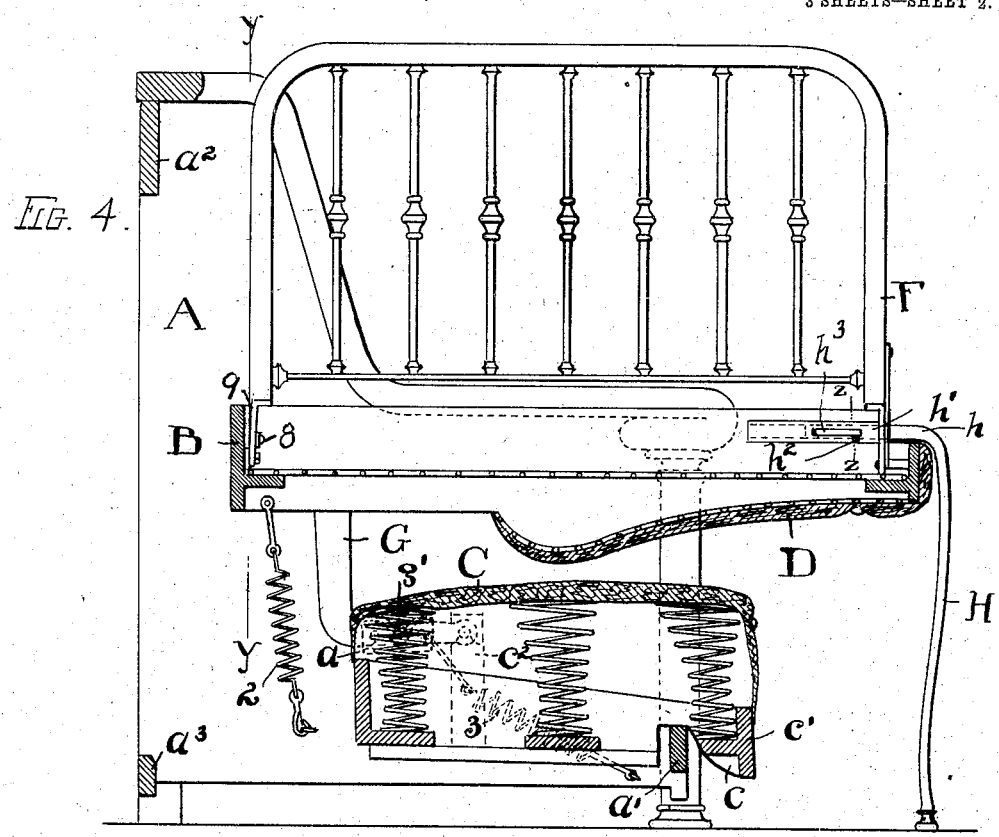
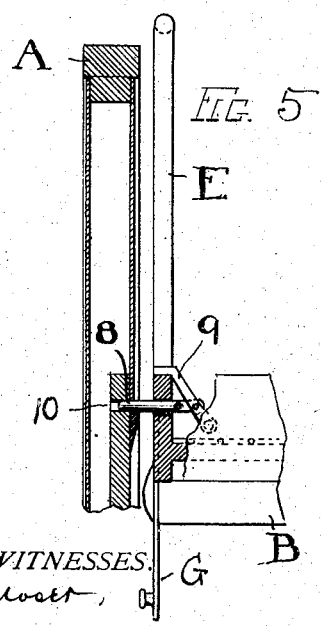
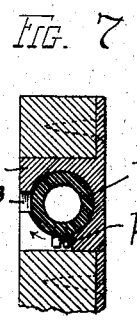
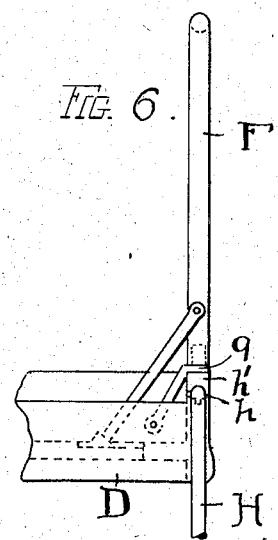
WITNESSES.
INVENTOR.
David T. Owen
BY H. J. Fisher
ATTORNEY.

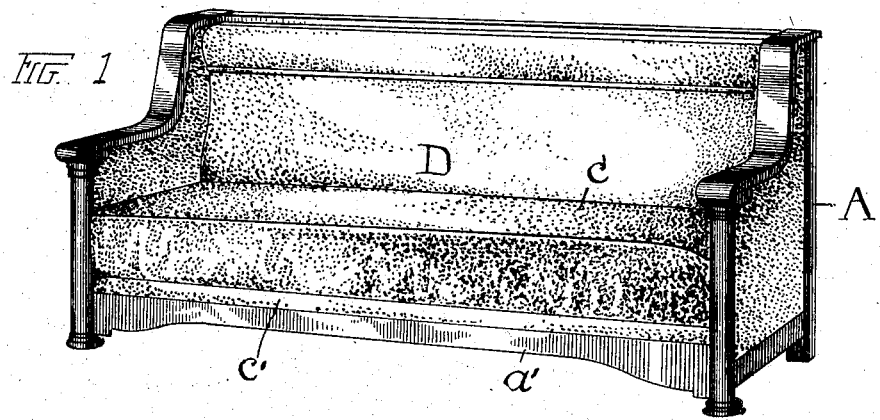
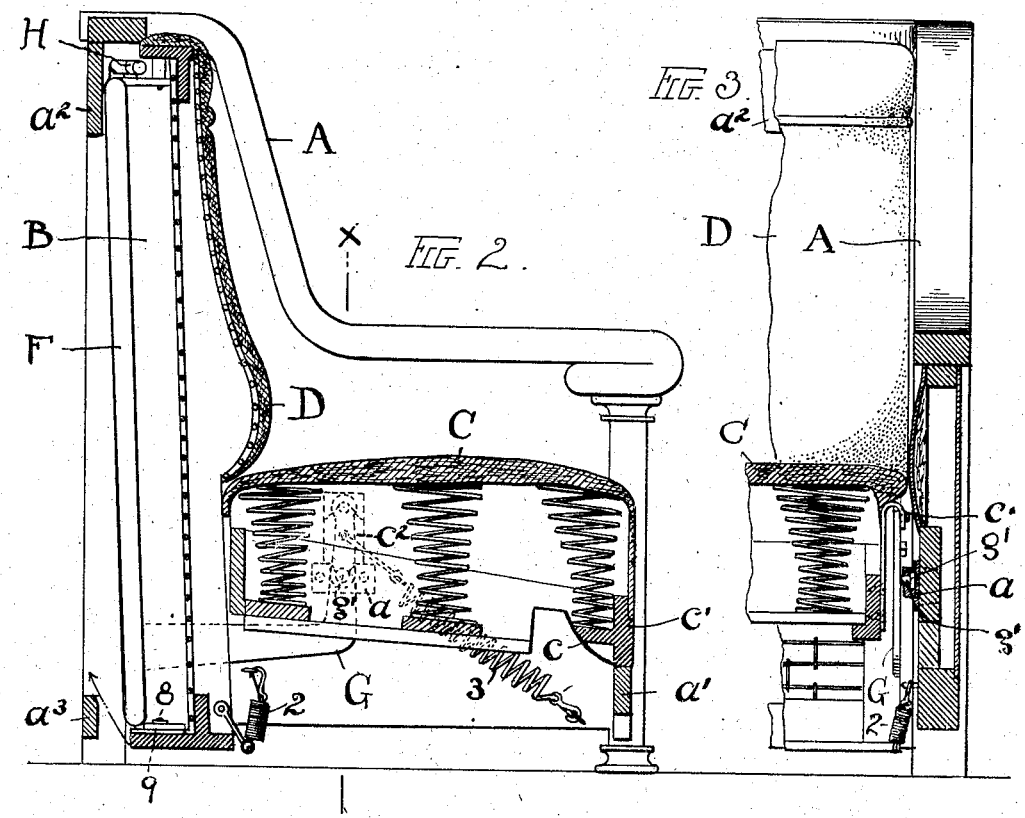

No. 791,721. PATENTED JUNE 6, 1905.
D. T. OWEN.
COMBINED BED AND COUCH.
APPLICATION FILED JAN. 9, 1905.
3 SHEETS—SHEET 3.
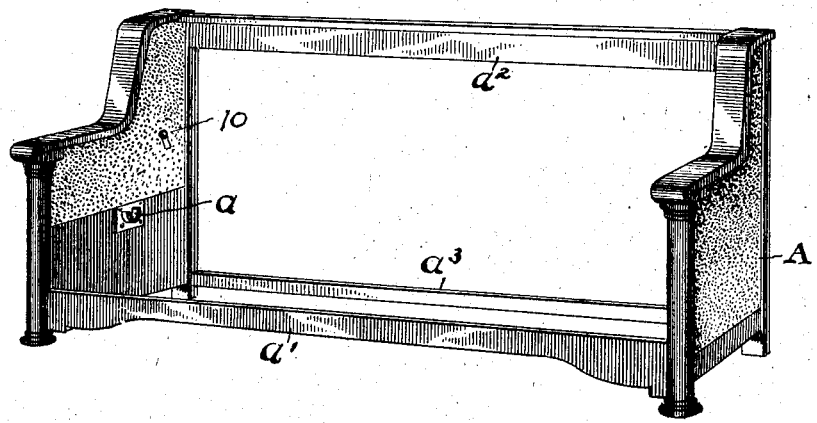
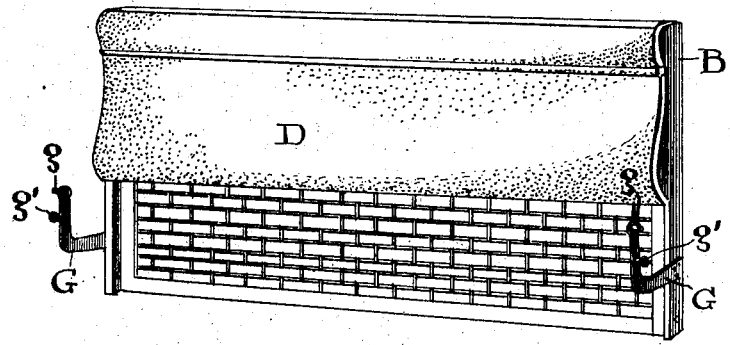
WITNESSES: INVENTOR.
ATTORNEY.

No. 791,721.  
Patented June 6, 1905.

UNITED STATES PATENT OFFICE.

DAVID T. OWEN, OF CLEVELAND, OHIO, ASSIGNOR TO THE D. T. OWEN COMPANY, OF CLEVELAND, OHIO, A CORPORATION OF NEW JERSEY.

COMBINED BED AND COUCH.

SPECIFICATION forming part of Letters Patent No. 791,721, dated June 6, 1905.

Application filed January 9, 1905. Serial No. 240,218.

*To all whom it may concern:*

Be it known that I, DAVID T. OWEN, a citizen of the United States, residing at Cleveland, in the county of Cuyahoga and State of Ohio, have invented certain new and useful Improvements in a Combined Bed and Couch; and I do declare that the following is a full, clear, and exact description of the invention, which will enable others skilled in the art to which it appertains to make and use the same.

My invention relates to improvements in a combined couch and bed; and the invention consists in the construction and combination of parts, substantially as shown and described, and particularly pointed out in the claims.

In the accompanying drawings, Figure 1 is a front perspective view of the invention converted into a couch, and Fig. 2 is a cross-sectional elevation thereof. Fig. 3 is a cross-section of Fig. 2 on line $x\,x$. Fig. 4 is a cross-section of the invention corresponding to Fig. 2, except in this instance it is converted into a bed and the couch is out of service beneath the bed. Fig. 5 is a sectional detail on line $y\,y$, Fig. 4; and Fig. 6 is an elevation showing the front corner of the bed when it is down, as in Fig. 4. Fig. 7 is an enlarged sectional view of one of the leg-supports on line $z\,z$, Fig. 4. Fig. 8 is a front perspective view of the main frame of the combined structure in position, as in Fig. 1, but with all the attached parts removed. Fig. 9 is a perspective view of the combined bed and back of the couch, showing the bottom of the bed with the back of the couch thereon; and Fig. 10 is a front perspective view of the couch-seat alone.

As thus shown, A represents the main frame of the structure, B the bed-frame, which carries also the back D of the couch fixed thereon, and C the couch-seat or seat-frame. Associated with these several parts are the folding head and foot frames E and F, respectively, on the ends of the bed-frame and adapted to fold thereupon, as has now become well known in this art and in prior inventions of my own, and right-angled or elbow arms G, fixed rigidly in their shoulder portion to the ends of the bed-frame approximately near its lower or rear edge. The said arms in their upper portions stand out and downward at right angles to the plane of the bed-frame, and thence in their forearms at right angles into a plane substantially parallel to the bed-frame, and are pivotally engaged at their extremities through the pins or lugs thereon by the hook-shaped pivot-plates $c^2$ on the ends of the couch seat or frame. The arms G are themselves pivoted about midway of their forearms at $g'$ on the main frame A in the end bearings or open rests $a$ thereon, so that this point becomes the support for said arms and the fulcrum of their operations. The couch seat or frame is adapted to be moved back and forth more or less horizontally into raised and lowered positions by means of the said crank-arms G as the bed is raised and lowered. To this end the said arms G are arranged relatively as shown and engage with the ends of the couch seat or frame at such a point both in elevation and in relation to the rear edge thereof that the rear edge of the seat will come forward of and somewhat above the angles of arms G, and thus keep the said arms out of sight in all the changes of the structure, and especially when converted into a couch. In this case the support of the couch comes vertically over the pivot-points $a$ of the arms on the main frame, and there is no tendency for the seat to crowd forward, while at the same time said arm also holds the seat positively back in place. To adapt the couch-seat frame to these changes it has a recess $c$ in each end, with a rounded edge forward thereof and adapted to ride or slide over or upon the foot-rail $a'$ of the main frame.

When the couch is raised to seating position, the front rail $c'$ thereof rests down upon the rail $a'$ of the main frame and constitutes a firm support for the couch-seat upon said rail, while the rear of the seat is firmly supported upon the arms G, as above described, and the couch cannot possibly escape therefrom nor move in any way until the bed is again lowered. This gives the couch all the firmness and fixedness, practically, of a permanent couch, while at the same time the bed is lowered at the rear thereof wholly out of view. In this relation the bed rests at its top against the top near rail or bar $a^2$ of the main frame and comes just above the floor at its lower edge within the lower rail $a^3$ of the main frame.

When the bed-frame is lowered for use, it is grasped by the hand at its upper edge and drawn forward. This gives it a rotary swinging movement on its pivots $g'$ at the same time that it is caused to rise and turn forward over the couch-seat, and the couch-seat in the same operation is carried forward and down, so as to drop with its recesses $c$ over the front rail $a'$ of the main frame until it gets lowered relatively as seen in Fig. 4 and is wholly out of the way of the bed. When the bed-frame is thus lowered or raised, the springs 2 and 3 come into action and are adapted to offset somewhat the distance the bed-frame is set back of and away from its pivot $a$ and to assist in overcoming the inertia of said frame, as well as to balance it over its dead-centers of rotation both ways. In all cases springs 2 and 3 coöperate and assist the person in swinging the bed on its pivots. To these ends springs 2 connect with the main frame at its rear and bottom at their other ends, and springs 3 connect with the forearms of arms G above their pivots and with the main frame forward at their other ends. When the bed is up, these springs are stretched and ready to help in lowering the bed, and when the bed is down the springs 2 are stretched and ready to help in raising it. Both sets of springs act over the dead-centers in rotation either way. Any desired strength can be given to either set of springs.

Specially-arranged front legs H are provided for the support of the front of the bed, and the said legs have right-angled upper extremities $h$, rotatably engaged in sockets or barrels $h'$, set into bed-frame B. In these sockets a substantially bayonet-joint is made for said legs, and they have lugs $h^2$, adapted to run in slots $h^3$ in said barrel and to lock against rotation in the outer offset portion of said slots, as seen in Fig. 4. When folded, the extremities or shanks $h$ are pushed back in said slot and the legs H fold in behind the outer and upper upholstered edge of the back D of the couch, relatively as seen in Fig. 2. Another feature of the invention is the bolts 8, pivotally connected with the pivot-arms 9 of the head and foot frames E and F, and passing through the ends of the bed-frame are adapted to enter holes 10 in the ends of the main frame, thereby locking the bed-frame with respect to the main frame and especially overcoming any tendency in the bed-frame to balance downward at the rear edge behind its pivot $g'$ under possible excessive weight at that side, as by persons sitting thereon.

The top edge of the couch-back extends upward above the corresponding edge of the bed-frame, so that when legs H are retired they lie behind said couch edge and are concealed from front view.

The peculiar construction of arms or pivot-supports G for both bed and seat provides certain advantages, which, itemized, are as follows: First, a rigid and firm support is obtained for both back and couch in both their open and closed positions; second, the bed is permitted to retire within the frame when closed and rest down approximately at the floor-level, and thereby bring a bed of average width within a couch-frame of average and pleasing proportions; third, the location of the bed-pivot permits the bed to be lowered without projecting the rear portion thereof beyond the limit of the frame at the rear, thereby requiring change in position of the main frame upon the floor and if backed against a wall, as is usually the case; fourth, the bed is raised to the proper plane for use as a bed and above the couch-seat, while the seat itself is lowered to prevent the upholstered surfaces from coming in contact; fifth, the bed is thrown forward sufficiently to bring the front edge thereof to permit the legs to be lowered and to give the operator free room to work without interference with the couch-seat, and, sixth, the right-angled portion of arm G permits free movement of the couch-seat without rubbing against the upholstering of the seat at the ends and also concealing said arms effectively at all times.

What I claim is—

1. In a combined bed and couch, a main frame, and separate bed and couch frames, and right-angled arms fixed to the bed-frame and pivotally engaged in their forearms with the couch and main frames.

2. The main frame and the couch and bed frames, and right-angled supporting and actuating arms fixed at one end on the bed-frame and pivotally connected with the couch-frame at the other, and pivotally engaged with the main frame substantially midway of said forearms.

3. The main frame and the bed and couch frames, in combination with right-angled arms fixed on one end on the bed-frame near the rear edge thereof and having forearms in a plane parallel to said bed-frame, said forearms pivoted on the main frame between their ends and pivotally connected with the couch-frame forward of said pivots on the main frame.

4. The main frame and the bed and couch frames, right-angled arms supporting the bed-frame on the main frame and pivoted to the ends of the couch-frame at their front and otherwise free extremities, in combination with springs to overcome the inertia and the dead-centers of the bed-frame.

5. The main frame having a bottom rail lengthwise at its front, and a couch-frame having recesses in its ends with curved edges adapted to ride down and up on said rail as said couch-frame is raised and lowered, in combination with a bed-frame pivoted on the main frame and operatively connected with said couch-frame.

6. The main frame and the bed-frame pivotally supported thereon and adapted to be lowered into a horizontal position for use, in combination with legs pivoted on the front of said bed-frame and barrels thereon fixed on said frame in which said legs are rotatably and slidably engaged, whereby said legs may be folded and removed from view when not used.

7. The main frame and the bed-frame pivoted thereon, and the couch-back on said bed-frame extending outward beyond the front edge thereof, in combination with front legs for the bed having right-angled upper ends and barrels on the bed-frame behind the edge of the couch-back and said legs slidably and rotatably engaged in said barrels and adapted to be folded behind the edge of the couch-back when the bed is raised.

In testimony whereof I sign this specification in the presence of two witnesses.

DAVID T. OWEN.

Witnesses:
R. B. MOSER,
C. A. SELL.